United States Patent [19]

Rines et al.

[11] Patent Number: 6,002,558

[45] Date of Patent: Dec. 14, 1999

[54] METHOD OF AND APPARATUS FOR EXPANDING FUNCTIONALITY OF VEHICLE CASSETTE TAPE-PLAYER DECKS TO PERMIT DICTATION OR OTHER RECORDING AND AUTOMATIC REMOTE STATION RELAYING OF THE SAME

[76] Inventors: Carol Mary Rines; Robert H. Rines; Justice C. Rines, all of 13 Spaulding St., Concord, N.H. 03301

[21] Appl. No.: 08/696,294

[22] Filed: Aug. 19, 1996

Related U.S. Application Data

[63] Continuation of application No. 08/380,242, Jan. 30, 1995, abandoned, which is a continuation of application No. 07/873,970, Apr. 24, 1992, abandoned, which is a continuation of application No. 07/584,134, Sep. 18, 1990, abandoned.

[51] Int. Cl.⁶ .......................... G11B 31/00; G11B 19/00; H04H 9/00; H04M 11/10
[52] U.S. Cl. ................................ 360/137; 360/79; 369/7; 369/25; 369/29; 379/75
[58] Field of Search .................................. 369/1, 2, 7, 25, 369/29; 379/75, 79, 65; 360/137, 79

[56] References Cited

U.S. PATENT DOCUMENTS

| | | | |
|---|---|---|---|
| 2,882,346 | 4/1959 | Jones | 369/29 |
| 4,303,998 | 12/1981 | Plunkett | 369/29 |
| 4,342,106 | 7/1982 | Sato | 369/7 |
| 4,488,274 | 12/1984 | Plunkett | 379/75 |
| 4,621,350 | 11/1986 | Sevitsky | 369/25 |
| 4,658,097 | 4/1987 | D'Agosto | 369/25 |
| 4,713,801 | 12/1987 | Hale | 369/7 |
| 4,955,051 | 9/1990 | Sato | 369/25 |

FOREIGN PATENT DOCUMENTS

| | | | |
|---|---|---|---|
| 3008103 | 9/1981 | Germany | 369/7 |
| 0173923 | 10/1983 | Japan | 369/7 |
| 63-14526 | 1/1988 | Japan . | |

OTHER PUBLICATIONS

Blaupunkt Autoradio SQR34 (1984 catalog).

500 SEL Mercedes Owner'Manual, 1984.

Minisette Catalogs 14–1027 (1985) and 14–1055A (1988).

*Primary Examiner*—David D. Davis
*Attorney, Agent, or Firm*—Rines and Rines

[57] ABSTRACT

Method and apparatus for expanding the functionality of vehicle cassette tape player decks to permit driver dictation or other recording and automatic remote station relaying of same through integration with cellular radio telephone apparatus and the like.

22 Claims, 3 Drawing Sheets

METHOD OF AND APPARATUS FOR EXPANDING FUNCTIONALITY OF VEHICLE CASSETTE TAPE-PLAYER DECKS TO PERMIT DICTATION OR OTHER RECORDING AND AUTOMATIC REMOTE STATION RELAYING OF THE SAME

This application is a continuation of Ser. No. 08/380,242 filed Jan. 30, 1995, now abandoned, which is a continuation of Ser. No. 07/873,970 filed Apr. 24, 1992, now abandoned, which is a continuation of Ser. No. 07/584,134 filed Sep. 18, 1990, now abandoned.

The present invention relates to vehicle tape decks and the like (the terms "tape", "tape deck" and "cassette" being generically used herein to embrace not only cartridges of magnetic storage strips or tapes but discs and other well-known recording media, as well), being more particularly directed to the expansion of the functionality of the same beyond the mere playing or reproducing of pre-recorded material to permit, also, dictation or other message recording by the vehicle operator (or passengers) and, where desired, automatic remote station relaying of the same from the vehicle (and also the vehicle AM/FM radio broadcast reception, if desired), as by cellular radio telephone.

BACKGROUND

While audio mono, multi-channel and stereo tape recorders (analog and digital) with recording and playback functions have been employed for decades in many settings, including fixed and portable versions, the conventional tape deck systems available for automobiles have been restricted to playback functions for the listening entertainment of the operator and other passengers. This operator-passive listening mode has extended, also, to FM and AM radio reception, though operator-active speaking from the vehicle has, within the past decade, become customary through the use of a separate cellular radio telephone transmitter-receiver also provided in the vehicle, but at a different location than the tape deck-radio receiver.

There are, however, serious restraints upon operator-active functions during vehicle movement that do not exist in the usual fixed or portable tape recorder settings, in view of the necessity that the operator give substantially total attention to driving and minimal or insignificant operational attention to the tape deck. It is to the problem of enabling such minimal diversion of the operator's attention while expanding the functionality of the tape deck to permit the operator to dictate and record and/or automatically transmit the dictation via the vehicle cellular radio, either in real time or by playback, that the present invention is primarily directed. Adding such facility to the vehicle-installed tape deck with safe and minimal attention diversion from the driving function obviates the current need for separate tape recorders to be carried by the operator or vehicle. And it also achieves the very desirable result of (1) enabling operator-active dictation for local storage while driving, and subsequent playback; (2) for real time automatic relay to remote stations, such as the operator or another's office, home, or message center or the like; and/or (3) for subsequent playback and automatic transmission to remote stations at desired times. With the incorporation of the features of the invention, furthermore, it also fortuitously becomes possible to enable recording of the AM-FM radio broadcast reception at the vehicle, if desired, and either real-time transmittal of the same to a remote location via the vehicle cellular radio telephone and/or the subsequent transmission by playback of the broadcast recorded by the tape deck.

OBJECT OF INVENTION

An object of the invention, accordingly, is to provide a new and improved method of and apparatus for expanding the functionality of current-day vehicle tape deck systems to permit safe and minimal operator-attention operator dictation or other message functions, as well; and with the further feature, where desired, of enabling automatic real-time relaying of the same, as over cellular radio telephone, to remote stations and/or for subsequent playback and automatic transmission to remote stations at desired times.

A further object is to enable, where desired, recording of the vehicle AM/FM radio broadcast reception and its transmission, where appropriate, to remote stations via the cellular radio telephone system.

Other and further objects are explained hereinafter and are more particularly delineated in the appended claims.

SUMMARY

In summary, however, from one of its important aspects, the invention embraces, for integration with a vehicle passive audio-tape cassette deck playback system having power, play, rewind and forward controls operable, in a play mode, to reproduce signals stored on a pre-recorded tape in audio form in a vehicle loudspeaker by scanning the tape forwardly by a playback head connected to playback amplifiers driving the loudspeaker, apparatus for rendering the system capable of active dictation recording use on a tape and simultaneous transmission to a remote location, or later transmission upon rewind and playing of the recorded tape, via a cellular radio telephone transmitter system also carried by the vehicle, said apparatus having, in combination, auxiliary apparatus comprising a microphone, audio amplifying means and a recording head cooperative with the tape for enabling the driver, upon actuation of a recording dictation mode, to dictate in the vehicle into the microphone and record such on the tape; programmable control means cooperative with the said auxiliary apparatus and with the modulator of said cellular radio telehpone transmitter system for switching said audio amplifying means, upon said actuation of the recording dictation mode, to energize said recording head to record the dictation on said tape and, after operation of said rewind control, to playback the same as recorded on the tape through one or both of two paths: one, through said playback amplifiers for driver listening through said vehicle loudspeaker, and secondly, for directly modulating the cellular radio transmitter modulator to transmit to a remote location; said programmable control means further having means, operable upon actuation of said recording dictation mode, for connecting said audio-amplifying means to said modulator, to transmit the dictation via the cellular radio telephone transmitter in real time during said dictation, selectively with or without simultaneous energizing of said recording head to record the dictation on said tape. Storage and/or cellular transmission of the vehicle radio broadcast reception is also feasible when required. Best mode and preferred designs for operation are later detailed.

DRAWINGS

The invention will now be described with reference to the accompanying drawings, FIG. 1 of which is a combined block and schematic circuit diagram of preferred apparatus for practicing the invention;

DESCRIPTION

Figure 1:
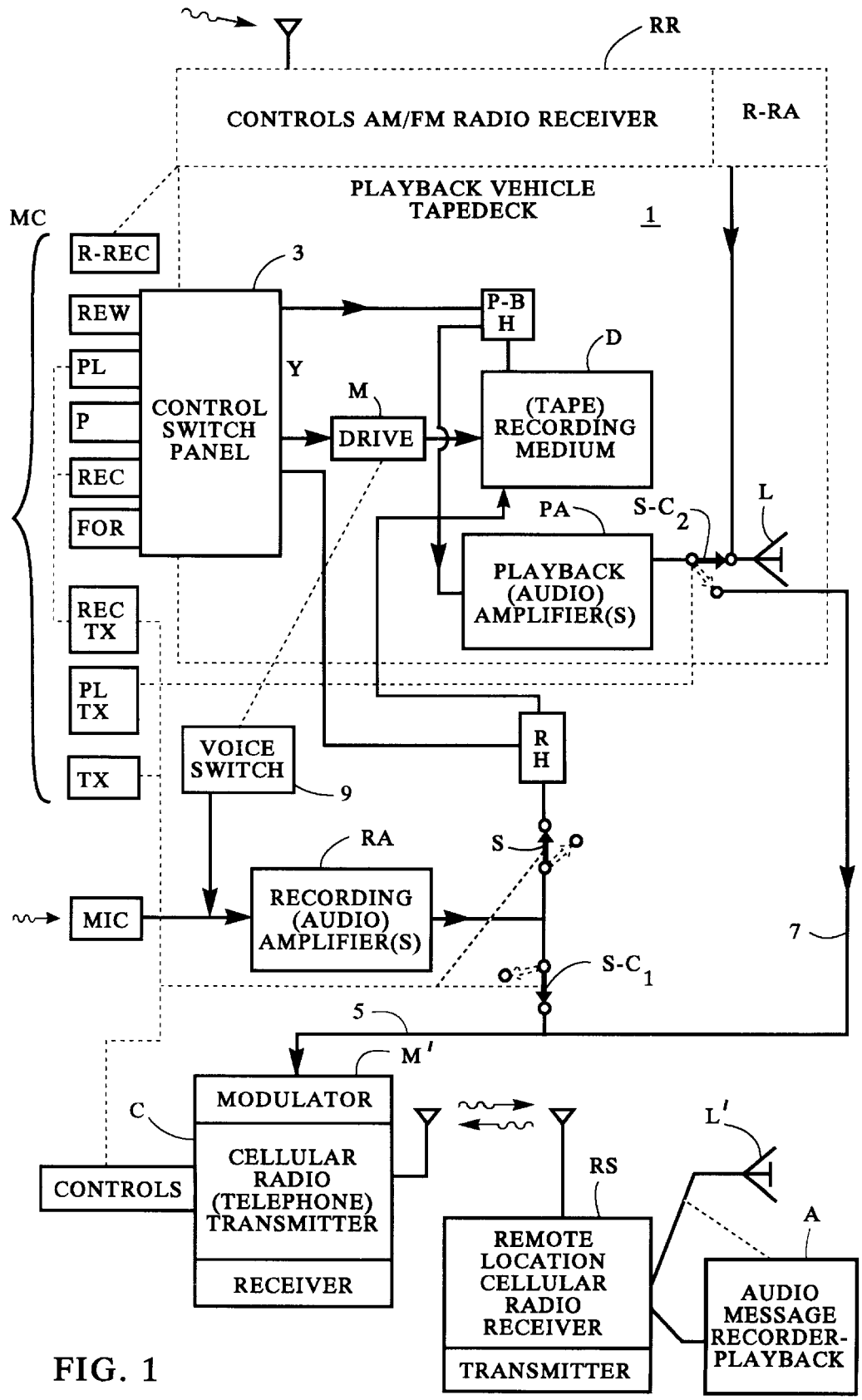

Referring to FIG. 1, a conventional automobile vehicle tape playback deck (mono, multi-channel and/or stereo) is shown at 1, having a switch control panel 3 displaying conventional power (P), play (PL), rewind (REW) and forward (FOR) buttons operating, in well-known and conventional manner, the motor drive (M) for the magnetic tape cartridge or cassette playback system D, with a cartridge or cassette access slot (not shown) for the operator to insert or remove a pre-recorded tape cassette. Similar comments apply for disc cassette recording and similar media systems all generally described as "cassette" as before stated. Typical vehicle cassette playback decks of this character, combined with an AM/FM car radio receiver, are, for example, the AM/FM Radio-Stereo Tape Deck Blaupunkt Autoradio SQR34 described in their 1984 catalog, or the Becker "Auto Radio" and cassette player described in the 500 SEL Mercedes Benz Owner's Manual 1984, or other well-known types. Following insertion of a recorded tape cassette and turn-on of the power at P, usually in common unit with the conventional AM/FM vehicle radio receiver RR, operation of the play button PL operates the motor drive M to cause scanning of the tape by the then operational playback head or sensor PB-H for generating electrical signals (analog or digital later converted to analog) amplified in playback amplifiers PA and transduced into audio sound at the vehicle local loudspeaker(s) L for passive listening by the vehicle operator and passengers, all as is well-known.

Also shown in FIG. 1 is the separate, conventional vehicle cellular radio telephone transmitter-receiver C, at the disposal of the operator and passengers at a different location of the front panel area for radio telephone communication with a remote station RS totally independently of the vehicle playback deck and AM/FM radio receiver. A typical car cellular radio is the Alpine Model 9511 Transceiver of Alpine Electronics of America, Inc.

In accordance with the present invention, as before stated, not only is the playback deck 1 extended in functionality to permit operator and/or passenger recording of dictation (thoughts, appointments, names, instructions, observations, reports, letters, tasks, or other messages, data or materials), but to enable automatic combination with the now totally separately functioning cellular radio telephone system C to permit transmission of the same to a remote location(s), either in real time or by subsequent playback of recording of the same at the vehicle tape deck. Such, as previously stated, can also be extended to the "messages" in the form of the received programs on the vehicle AM/FM radio receiver.

Thus, in FIG. 1, there is shown added to the playback "tape" deck 1 auxiliary apparatus, also interconnected with the cellular telephone C, which may now be physically located (or at least dictation or other message controls for transmission thereover) as part of or in close proximity to those of the radio-tape deck unit. Such auxiliary apparatus includes a dictation microphone MIC with its amplifier(s) RA and recording head RH, and control buttons, just as readily and safely accessible to the operator as the playback tape deck controls, for automatic real-time modulation by the dictated message (TX), such combined real-time modulation and recording on the tape deck (REC-TX), or just modulation of the cellular telephone radio transmission (PL-TX) without recording at the vehicle—such, however, all being recordable for playback at the remote station cellular telephone receiver RS at A, and/or direct listening in real-time at L'.

In actual practice, at least some of these functional controls are susceptible of microprocessor control, schematically indicated at MC, and of conventional type (as, for example, in the PROM-equipped Intell microprocessor type 8051) though, for illustrative and explanatory purposes, they are shown implemented by switches and gang-control lines in FIG. 1 which, in practice, can be software implemented as is well known.

Figure 2:
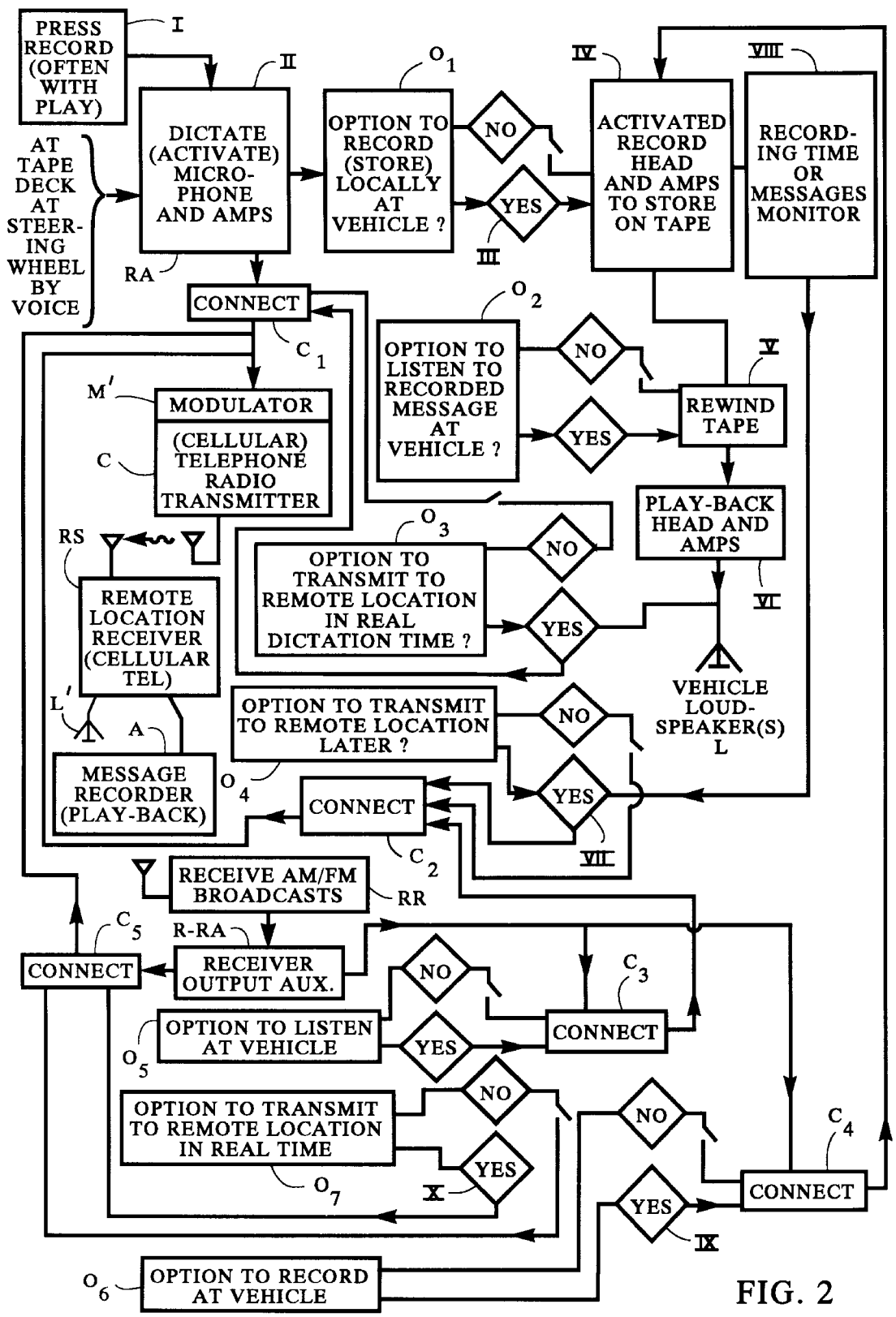
FIG. 2 is a flow diagram of the operation.

Referring to the switching sequence and operation and program flow chart of FIG. 2, and considering first the added functionality of the operator dictation and local recording when driving (Option $O_1$ in FIG. 2), in fashion similar to the operator's current-day pressing of the play mode (PL) of the tape deck 1, the operator may depress PL and the added record button REC together (Step I in FIG. 2), as in the conventional fashion in tape recorders (illustrated by dotted line gang connection) to initiate the added dictation function. The circuitry for effecting this by rendering operational the microphone MIC-recording amplifiers RA-recording head RH-and tape motor drive M, may, for example, be identical to that of well-known conventional tape recorders, including the type of circuits of the Minisette-15 and 20 cassette recorders described in respective catalogs 14-1027 and 14-1055A of Tandy Corporation, 1985 and 1988, respectively, or other well known recorder systems of this character. This will cause the recording amplifiers RA, FIG. 1, to energize the recording head RH via switch S, and record the dictation (or other "message") on a blank tape D, as shown by Steps II, III and IV in FIG. 2, so-labelled. Particularly for minimal driver concern, a voice or sound-activated on-off switch 9 is preferably employed (as, for example, of the said Minisetts 15 and 20 recorders) to activate recording only when dictation commences and during voice activity.

Following recording, with the same minimal diversion from driving attention as in current radio and tape deck operation in cars, particularly in view of the incorporation of controls in the single deck region, should the operator desire playback of the recording (Option $O_2$ in FIG. 2), conventional rewind step V and playback step VI are effected (REW and PL controls in FIG. 1), enabling listening to the recording at the local vehicle loudspeaker(s) L, FIGS. 1 and 2.

As before discussed, should the operator desire the dictation or other message to be transmitted automatically to a remote station to which the cellular radio telephone is dialed in conventional fashion, including by special code button, this may, in accordance with the features of the invention, be achieved in real time (with or without recording at the vehicle tape deck). It may be done later either when a certain number of dictated inputs have been effected or after a certain desired monitored time has elapsed, by rewind and playback of the recorded tape with automatic modulation of the cellular telephone transmitter circuitry. This is as distinguished from modulation by voice spoken into the cellular telephone mouthpiece as in voice telephone communication (now disconnected or switched out, as later detailed)—all automatically effected without the driver being involved other than actuating the desired function button control.

Considering, first, Option $O_3$ of FIG. 2, if it is desired to transmit the dictation in real time to a remote location on station RS while recording the same in the tape deck 1, as for transmitting information/data back to a person's office or secretary for follow-up, with a record kept on the vehicle tape, after ordering election of the before-discussed Option $O_1$, the added function control button REC-TX is actuated (as under control of MC) opening a CONNECT gate switch S-$C_1$ to enable the microphone amplifier output (RA, FIG. 1) to apply modulation signals to the modulator of the cellular telephone transmitter circuit (M' in FIGS. 1 and 2) and thus to transmit the dictation over the air to the remote station(s) RS, where it may be heard at L' and/or stored for later playback at A. In the schematic switch analogy format of FIG. 1, switch S-C$_1$ closes in response to actuation of control button REC-TX (illustrated by dotted gang-line), connecting amplifier(s) RA by line 5 to the input of the modulator M'. This may be direct analog signal modulation (AM or FM), or sampling may be involved and digital format may be transmitted and reconverted to analog voice or other audio content of the dictated or recorded message at the receiver RS, as is well-known.

Seletion of the "NO" path at Option O$_1$ will avoid recording at the tape deck 1, as where it is desired to transmit the dictation automatically and directly to the remote station (s) via the cellular radio telephone system without recording on the vehicle tape deck (switch S open in FIG. 1).

In the event, however, it is not desired to transmit to the remote station at the time of dictation, namely Option O$_4$ of FIG. 2, then before-mentioned Option O$_2$ may be initiated at a desired time to effect previously described rewinding and then playback Steps V and VI, with a selection of Step VII of Option O$_4$ (button PL-TX, FIG. 1) enabling "CONNECT" switching gate C$_2$ to feed the output of the playback amplifier(s) directly to modulate the cellular telephone radio transmitter circuit at M', as before explained. In the circuit of FIG. 1, this is shown effected by the dotted-line gang control of PL-TX closing switch S-C$_2$ to feed the output of playback amplifiers PA to the modulation circuit M' via line 7.

The time selected for the playback transmission of the recorded dictation or other message via the cellular telephone radio line C to the remote station RS may be arbitrary or automatic, including after a predetermined length of time has been monitored at Step VIII, FIG. 2, or a certain number of messages or inputs has been effected; or on demand.

With the microprocessor control MC and the integration of tape deck and cellular radio telephone systems, the above sets of functions may readily be pre-formatted or pre-programmed for the desired options or modes, thereby making it a simple on/off situation (schematically designated by "MC" setting or control) for the operator, readily changeable as different needs arise—thus adding to the safety of the vehicle operation and minimum distration.

As previously discussed, furthermore, the invention readily lends itself, also, to recording and/or remotely transmitting (via the cellular telephone system), where desired, the messages or programs received by the vehicle AM/FM radio receiver, generally currently proximally integrated into the playback deck front panel assembly. Thus, as shown by conventional Option O$_5$ in FIG. 2, the operator or passenger listens to the programs ("messages") by turning on and tuning in, so that the receiver output amplifiers R-RA drive the vehicle loudspeakers L (schematically shown as by CONNECT C$_3$) in normal fashion. Should it be desired (Option O$_6$) to record the same with the system of the invention (R-REC, FIG. 1), Step IX, an appropriate part of the output of the receiver output amplifiers R-RA is fed via CONNECT gate C$_4$ to the record amplifiers of the tape deck (Step IV, FIG. 2). If Option O$_7$ is selected to tranmit the received broadcast information to the remote station RS, then Step X is effected, connecting the receiver output amplifiers R-RA at C$_5$ to the modulator circuit M' of the cellular radio telephone transmitter C.

The invention, through its extending of the functionality of the current playback deck, and with cellular telephone integration, thus provides for greatly increased and facile information communication and storage. This is most desirable for vehicle operators who wish to record and/or transmit, real time thoughts and observations without impairing vehicle operation—inspectors of traffic, advertising, signs, buildings, road, etc.; writers, executives, doctors, lawyers, engineers, other professionals—virtually everyone who wishes to capture thoughts or record or impart information, data and observations while driving.

Figure 3:
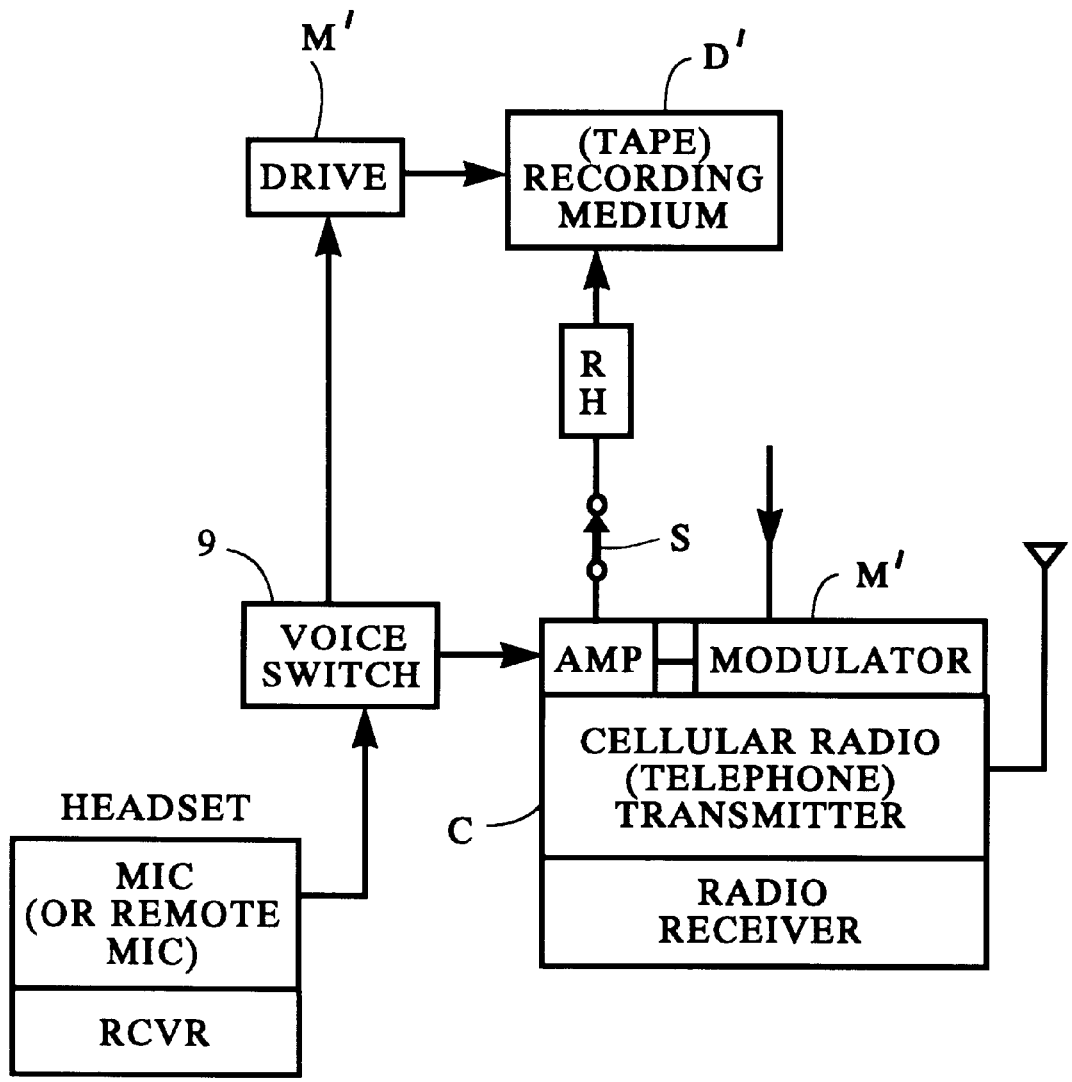
FIG. 3 is a partial block diagram of a modification.

The microphone MIC, in the system integration of the invention, instead of being part of the add-on to the tape deck, may be the microphone of the cellular radio headset or a remote microphone MIC therefor, FIG. 3. Again, voice switch control 9 is preferred to minimize operator or driver attention and functions, such as the voice actuated controls described in said Minisette catalogs or in other well-known recorders of such character. The recording medium D', drive M', etc., may, in such instance, be treated as an add-on to the cellular radio system C, with the amplifier circuit (AMP) that drives the modulator M' serving, also, when required, to energize the recording head RH.

Further to minimize driver distraction or adjustment, the controls shown to the left in FIG. 1 may be incorporated at or within the steering wheel structure; and/or the control switches may be actuated by voice commands, recognized by predesignated voice command words; i.e., the driver-expressed words "RECORD" (to actuate REC and PL); "RECORD AND TRANSMIT", (to actuate REC-TX); etc., or coded words or numbers, now fully implementable by well-known technology.

As above observed, the invention is not limited to magnetic recording strips but is equally applicable with other types of recording media including laser and other discs and the like; and, while cellular telephone radio links are preferred for incorporation, other radio or radiant energy communication systems may also be employed therewith.

Further modifications will also occur to those skilled in this art and such are considered to fall within the spirit and scope of the invention as defined in the appended claims.

What is claimed is:

1. For integration with a driver-operated vehicle passive audio-tape cassette deck with playback system having power, play, rewind and forward controls operable, in a play mode, to reproduce signals stored on a pre-recorded tape in audio form in a vehicle loudspeaker by scanning the tape forwardly by a playback head connected to playback amplifiers driving the loudspeaker, apparatus for rendering the system capable of both active dictation recording use on a tape and simultaneous transmission to a remote location, and later transmission upon rewind and playing of the tape, via a cellular radio telephone transmitter system including a modulator also carried by the vehicle, said apparatus having, in combination, auxiliary apparatus comprising a microphone assembly, audio amplifying means and a recording head cooperative with the tape for enabling the driver, upon actuation of a recording dictation mode, to dictate in the vehicle without operational diversion into the microphone and record such on the tape,; programmable control means cooperative with the said auxiliary apparatus and with the modulator of said cellular radio telephone transmitter system for switching said audio amplifying means, upon said actuation of the recording dictation mode, to energize said recording head to record the dictation on said tape and, after operation of said rewind control, to playback the same as recorded on the tape through two paths; one, through said playback amplifiers for driver listening through said vehicle loudspeaker, and secondly, for directly modulating the cellular radio transmitter modulator to transmit to a remote location; said programmable control means further having means, operable upon actuation of said recording dictation mode, for electrically connecting said audio-amplifying means to said modulator, to transmit the dictation via the cellular radio telephone transmitter in real time during said dictation, selectively with simultaneous energizing of said recording head to record the dictation on said tape, and in which said deck playback system is associated with a radio broadcast receiver, and means is provided for enabling received programs selectively to be recorded on said tape and to be transmitted to a remote location via said cellular radio telephone transmitter system in one of real time of recording and on playback of the recorded tape.

2. Apparatus as claimed in claim 1 and in which there is provided means for switching broadcast receiver output to said audio amplifying means to effect recording and to the said modulator to effect the transmission to a remote location.

3. In a driver operated vehicle provided with a cellular radio transmitter and receiver telephone system having both voice-responsive modulation and recorder playback signal modulation means for permitting radio communication by the vehicle driver during operation of the vehicle and also provided with a vehicle entertainment player tape deck for the driver to listen to tapes while operating the vehicle, apparatus for expanding the use of the vehicle player tape deck to permit diversionless dictation by the driver, that comprises, microphone and recording amplifying components comprising dictating apparatus added and connected integrally to the player tape deck to enable recording of dictation on a tape inserted in said player tape deck; means integrating and interconnecting said cellular radio transmitter telephone system and said dictating apparatus for automatically enabling transmission of said dictation over the cellular radio system selectively in one or more of the following option modes: in real time during voice dictation and simultaneous recording; in real time voice dictation without recording; and at a selected time after dictation recording by playback; and in which means is provided for receiving AM/FM radio broadcast signals in the vehicle and means for automatically transmitting the said signals over said cellular radio transmitter telephone system in one or more of the option modes of transmitting in real time and simultaneous recording, real time without recording, and a selected time after recording by playback.

4. Apparatus as claimed in claim 3 and in which means is provided for enabling said transmitting in all of said option modes.

5. In a driver operated vehicle provided with a cellular radio transmitter and receiver telephone system having both a voice-responsive and recorder playback signal modulator for permitting radio communication by the vehicle driver during operation of the vehicle and also provided with a vehicle entertainment player tape deck for the driver to listen to tapes while operating the vehicle, apparatus for expanding the use of the vehicle player tape deck, that comprises, recording amplifying components added and connected integrally to the player tape deck to enable recording on a tape inserted in said player tape deck; a radio receiver for receiving audio information-containing AM/FM radio signals in the vehicle; circuits interconnecting said cellular radio transmitter telephone system modulators, the AM/FM radio signal receiver, and said recording components for automatically enabling transmission of the audio information of the received AM/FM radio signals over the cellular radio system; the circuits for automatically transmitting the audio information contained in the AM/FM radio signals over said cellular radio transmitter telephone comprising mode selective switching circuits for enabling such transmission in one or more of the option modes of transmitting in real time and simultaneous recording, real time without recording, and a selected time after recording by playback.

6. A combined vehicle entertainment audio-tape player and tape recorder cassette deck system provided with playback/recording head and audio amplifier means and respective vehicle loudspeaker and recording microphone, and a vehicle cellular radio telephone transmitter with a voice communication telephone, having, in combination therewith, a dictation-recording switch selectively actuable by the vehicle driver for energizing the recorder to enable the driver to dictate locally in the vehicle into the microphone and, through the operation of the audio amplifier means, to energize the head means, locally to record the driver dictation on a cassette tape; and a programmable control switching circuit operable by the driver in one mode, upon driver actuation of the dictation recording, for disconnecting the telephone and causing the audio amplifier means, in addition to energizing the head means to record the dictation on the cassette tape, simultaneously also directly to modulate the cellular radio telephone transmitter to transmit the dictation to a remote location in real time during and simultaneously with the driver dictation recording locally in the vehicle on the cassette tape.

7. Apparatus as claimed in claim 6 and in which the modulating by the audio amplifying means connected with the microphone is controlled by voice switching.

8. Apparatus as claimed in claim 6 and in which microprocessor means controls the said switching of said audio amplifying means, being pre-programmed to enable driver pre-selected option functions.

9. Apparatus as claimed in claim 8 and in which there are provided option functions: record locally at the vehicle; listen to the playback of the recorded tape at the vehicle; transmit to remote location in real dictation time; and transmit to remote location later after dictation.

10. Apparatus as claimed in claim 6 and in which means is provided for controlling the playback of the recorded tape in response to one of a preselected time period after dictation, and a predetermined number of dictated messages.

11. Apparatus as claimed in claim 6 and in which said microphone is common and shared by said recorder and said cellular radio transmitter.

12. Apparatus as claimed in claim 6 and in which the actuation of the recording dictation mode is effected by a switching device disposed in the driver steering wheel region.

13. Apparatus as claimed in claim 6 and in which the driver actuated switching is effected by a driver-operated switch control located at the vehicle steering wheel structure.

14. Apparatus as claimed in claim 6 and in which the driver actuated switching is effected by driver voice-command actuated switches.

15. A combined vehicle entertainment audio-storage medium player and recorder cassette deck system provided with playback/recording head and audio amplifier means and respective vehicle loudspeaker and recording microphone, and a vehicle cellular radio telephone transmitter with a voice communication telephone, having, in combination therewith, a dictation-recording switch selectively actuable by the vehicle driver for energizing the recorder to enable the driver to dictate locally in the vehicle into the microphone and, through the operation of the audio amplifier means, to energize the head means locally to record the driver dictation on a cassette storage medium; and a programmable control switching circuit operable by the driver in one mode, upon driver actuation of the dictation recording, for causing the audio amplifier means, in addition to energizing the head means to record the dictation on the cassette storage medium, simultaneously with the telephone disconnected also to modulate the cellular radio telephone transmitter to transmit the dictation to a remote location in real time during and simultaneously with the driver dictation recording locally in the vehicle on the cassette storage medium.

16. Apparatus as claimed in claim 15 and in which the driver actuated switching is effected by a driver-operated switch control located at the vehicle steering wheel structure.

17. Apparatus as claimed in claim 15 and in which the driver actuated switching is effected by voice-command actuated switches.

18. A combined vehicle entertainment audio-storage medium player and recorder cassette deck system as claimed in claim 15 wherein the programmable control switching circuit is operable by the driver in another mode after the completion of the dictation for energizing the playback head to playback the recorded dictation, with the audio amplifier means adapted both to energize the vehicle loudspeaker so that the driver may locally listen to the played back dictation, and to modulate the cellular radio transmitter to transmit the played back dictation to a remote location.

19. Apparatus as claimed in claim 18 and in which the programmable control circuit is actuable automatically to cause the audio amplifier means to modulate the cellular radio transmitter with the played back dictation after the lapse of one of (1) a predetermined set time after the driver is recording of the dictation, and (2) a predetermined number of dictations has been recorded.

20. Apparatus as claimed in claim 18 and in which the programmable control circuit is actuable to cause the audio amplifier means simultaneously to energize the loudspeaker and to modulate the cellular radio transmitter with the played back dictation.

21. Apparatus as claimed in claim 18 and in which the programmable circuit also enables the initializing of a mode for recording from other audio sources including a vehicle radio.

22. For integration with a vehicle driver-operated passive audio-storage medium player cassette deck system provided with a playback mechanism for playing pre-recorded audio signals on the storage medium in a vehicle loudspeaker, apparatus for rendering the system capable of both dictation recording locally in the vehicle and cellular radio telephone transmission of the dictation to a remote location during and simultaneously with the dictation and via a cellular radio telephone transmitter with a voice communication telephone also carried by the vehicle, said apparatus having, in combination, an auxiliary apparatus comprising a microphone, an audio amplifier connected thereto, and a recording head for recording on a storage medium inserted in the cassette deck; a dictation-recording switch selectively actuable by the driver for enabling the driver to dictate, locally in the vehicle into the microphone, and, through the operation of the audio amplifier, to energize the head to record the dictation on the cassette storage medium; a programmable control switching circuit cooperative with said auxiliary apparatus and operable in one mode, upon the actuation of the dictation recording, for causing the audio amplifier, in addition to energizing the head to record the dictation on the cassette storage medium, simultaneously with the telephone disconnected also to modulate the cellular radio telephone transmitter to transmit the dictation to the remote location during and simultaneously with the dictation recording in the vehicle on the cassette storage medium.

* * * * *